United States Patent [19]

Takamura et al.

[11] 3,924,467
[45] Dec. 9, 1975

[54] FLOWMETER

[75] Inventors: Akio Takamura, Tokyo; Tsutomu Harada, Kawasaki, both of Japan

[73] Assignee: Kabushiki Kaisha Ono Sokki Seisakusho, Tokyo, Japan

[22] Filed: Dec. 17, 1973

[21] Appl. No.: 425,221

[30] Foreign Application Priority Data
July 1, 1973  Japan.................. 48-74574
July 1, 1973  Japan.................. 48-74575
July 1, 1973  Japan.................. 48-74576

[52] U.S. Cl. ................................. 73/213
[51] Int. Cl.² .......................... G01F 1/44
[58] Field of Search ........ 73/194 M, 205 R, 205 D, 73/213

[56] References Cited
UNITED STATES PATENTS

| | | | |
|---|---|---|---|
| 3,232,104 | 2/1966 | Fishman et al. | 73/205 |
| 3,251,226 | 5/1966 | Cushing | 73/205 |
| 3,266,309 | 8/1966 | Fishman et al. | 73/205 |
| 3,371,530 | 3/1968 | Howe | 73/205 |

FOREIGN PATENTS OR APPLICATIONS

| | | | |
|---|---|---|---|
| 1,089,860 | 6/1965 | United Kingdom | 73/205 |
| 1,065,280 | 4/1967 | United Kingdom | 73/205 |
| 1,026,602 | 4/1966 | United Kingdom | 73/205 |

OTHER PUBLICATIONS

Flo–Tron, Inc. Bulletin F1 Recieved in Office 12/16/64.

*Primary Examiner*—Herbert Goldstein
*Attorney, Agent, or Firm*—Hans Berman; Kurt Kelman

[57] ABSTRACT

A flowmeter comprising a shunt pipe connected in parallel with a Venturi tube to a main pipeline through which the fluid to be measured with respect to a flow rate thereof flows. The shunt pipe includes a feed pump for circulating a certain part of the fluid flowing through the main pipeline, through the shunt pipe and the Venturi tube. A differential pressure detector is provided to measure a differential fluid pressure between the throat portion and the upstream, maximum inner diameter portion of the Venturi tube. In a second form of the invention, a flowmeter comprises two similar units connected to each other in a mirror image relation end to end, each unit including a flowmeter of the character mentioned above. In a third form of the invention, a Venturi-tube device includes an axially movable needle means provided concentrically in a Venturi tube for changing the minimum effective sectional area of the throat portion of the Venturi tube.

12 Claims, 9 Drawing Figures

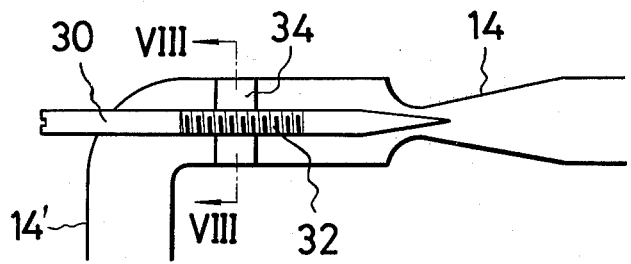
Fig. 7
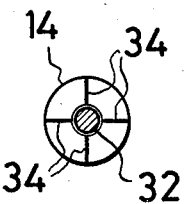
Fig. 8
Fig. 9
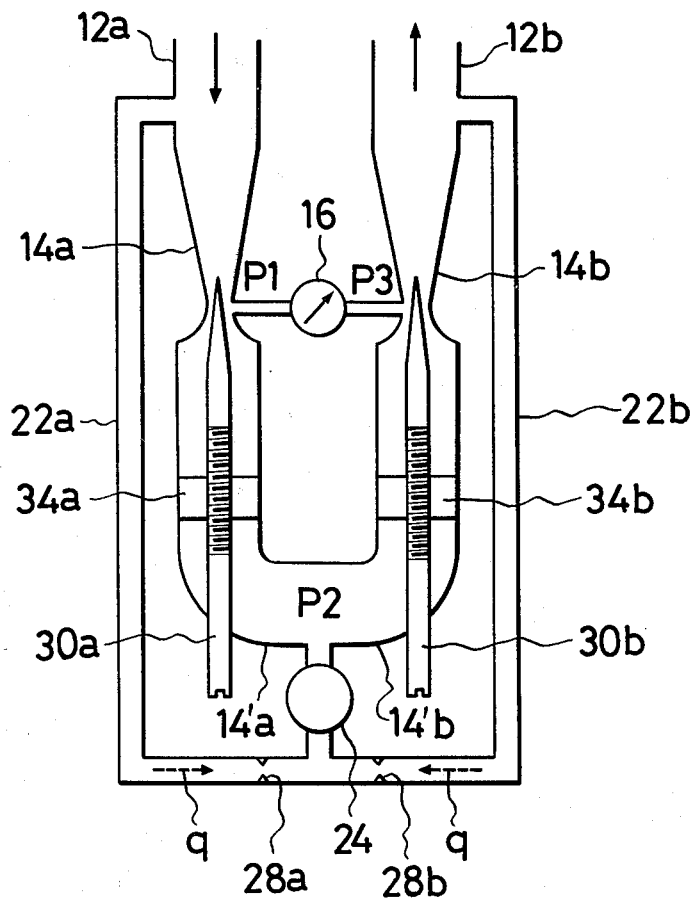

FLOWMETER

BACKGROUND OF THE INVENTION

This invention relates to a flowmeter and, more particularly, to a Venturi-tube type flowmeter for measuring a flow rate or mass flow rate of fluid flowing through a main pipeline.

When the flow rate of fluid flowing through a pipeline is measured by a Venturi tube connected to the pipeline, a volmetric flow rate Q of the fluid is generally given in the following expression:

$$Q = C \cdot \alpha \sqrt{\frac{2g(P1 - P2)}{\gamma}} \quad (1)$$

where
c is a coefficient dependent on the Venturi tube to be used,
$\alpha$ is a flow coefficient of the Venturi tube,
$\gamma$ is the density of the fluid flowing through the Venturi tube,
P1 is a fluid pressure in the maximum inner diameter portion of the Venturi tube situated just upstream of and integral with the throat portion thereof,
P2 is a fluid pressure in the throat portion of the Venturi tube, and
g is the gravitational acceleration.
Now, the expression (1) is rewritten as follows:

$$Q^2 = \frac{2g}{\gamma} K (P1 - P2) \quad (2)$$

where K is $c^2 \times \alpha^2$.

Therefore, the volumetric flow rate Q of the fluid is obtained by detecting the differential fluid pressure (P1 − P2) in the form of an electric voltage or current using a differential pressure converter. However, since this detected output, as is clear from the equation (2), is in proportion to the square of the flow rate of the fluid, it has been requested to use jointly a square root extracting unit to obtain an output proportional to the flow rate of the fluid.

If the flow rate of fluid to be measured is small, there is a great error involved in the measurement due to the square characteristic of the output of the differential pressure gauge. Accordingly, a measurable range for the flow rate can not include the one of zero to a certain flow rate.

It is, therefore, one object of this invention is to provide a flowmeter wherein the output of a differential fluid pressure measured by the flowmeter has a substantially linear relationship to the flow rate of fluid flowing through the flowmeter.

A further object of this invention is to provide a flowmeter having an enlarged measurable range of flow rate extending from zero to any desired value.

A still further object of this invention is to provide a flowmeter having a large differential pressure output compared to that of the prior art.

Yet another object of this invention is to provide a flowmeter having high accuracy and sensibility.

As is clear from the expression (2), the output of a differential fluid pressure (P1 − P2) is proportional to the density of the flowing fluid. Therefore, when the density of the fluid is not clear or is changed dependent on a temperature, the measured result would make no sense without using jointly a density measuring unit.

Another object of this invention is to provide a mass flowmeter which can obtain the output of a differential fluid pressure proportional to the mass flow rate of fluid flowing through the flowmeter without using any densimeter together.

Generally speaking, a Venturi tube provides a low pressure loss in the fluid flowing therethough, compared to an orifice, a nozzle and so on. This is because the fluid flowing through the Venturi tube drops at the throat portion thereof, but recovers at the following, downstream diffuser portion thereof in pressure. It is said that a Venturi tube constructed with a high accuracy according to a best design can attain a pressure recovery of more than 99 percent.

Yet another object of this invention is to provide a mass flowmeter wherein a pressure loss in fluid flowing through the flowmeter occurring between the inlet and the outlet of the flowmeter is small.

The flow coefficient $\alpha$ shown in the equation (1) is expressed according to Bernoulli's theorem as follows:

$$\alpha = \frac{A^2}{A^2 - a^2} \quad (3)$$

where A is the sectional area of the upstream, maximum inner diameter portion of the Venturi tube, and $a$ is the sectional area of the throat portion of the Venturi tube.

In the expression (1), the coefficient c is the one determined by the viscosity of the fluid flowing through the Venturi tube, the shape and condition of the inner wall surface of the Venturi tube and so on, and is usually determined experimentally because of the difficulty of a theoretical prediction.

As is obvious from the above just mentioned, a Venturi tube includes not only a coefficient such as can not be determined without resorting to experiments, but also sectional areas of both of the upstream, maximum inner diameter portion and the throat portion of the Venturi tube which are difficult to conform to desired values, respectively, due to the problem of an accuracy of finishing and therefore request to correct usually several times improper structural portions of the Venturi tube to obtain the desired sectional areas.

A further object of this invention is to provide a Venturi tube device having a changable flow coefficient and therefore easy to manufacture to a complete and satisfactory form in a short time.

A still further object of this invention is to provide a Venturi tube device having a changable flow coefficient, easily applied to and incorporated into a mass flowmeter.

SUMMARY OF THE INVENTION

Briefly, in one form, the flowmeter of this invention comprises a shunt pipe communicating at one end with the maximum inner diameter portion of a Venturi tube situated upstream of an integral with the throat portion thereof and at the other end with the maximum inner diameter portion of a diffuser portion situated downstream of and integral with the throat portion of the Venturi tube. The shunt pipe includes a feed pump for circulating as a biasing flow a predetermined part of fluid, which flows through a main pipeline connected to the Venturi tube, through the shunt pipe and the Venturi tube. This causes to shift a measuring range for the flow rate of the fluid from a non-linear area to a linear one and effect therefore an accurate and fine measurement of the flow rate.

In a second form, the mass flowmeter of this invention comprises two Venturi tubes of the character just mentioned connected to each other in a mirror image relation end to end. This provides a detected output proportional to the massive flow rate of fluid flowing through the flowmeter.

In a third form, the Venturi-tube device of the invention comprises an axially movable needle means provided concentrically in a Venturi tube for regulating the magnitude of the effective sectional area of the throat portion of the Venturi tube.

The invention which is sought to be protected will be particularly pointed out and distinctly claimed in the claims appended thereto. However, it is believed that this invention and the manner in which its various objects and advantages are obtained as well as other objects and advantages thereof may be more clearly understood by reference to the following detailed description of preferred embodiments thereof particularly when considered in the light of the accompanying drawings. Like reference characters are used to designate like or corresponding portions and parts of embodiments throughout the several views of the drawings.

BRIEF DESCRIPTION OF DRAWINGS

FIG. 7 is a schematic view of one form of a Venturi-tube device according to this invention including an axially movable needle means supported concentrically in a Venturi tube for regulating the effective sectional area of the throat portion of the Venturi tube, through which area the fluid to be measured flows;

FIG. 8 is a sectional view through the Venturi-tube device taken along the line VIII — VIII of FIG. 7; and FIG. 9 is a diagramatic view of a still further form of mass flowmeter according to this invention incorporating two Venturi-tube devices of the character shown in FIG. 7.

DESCRIPTION OF PREFERRED EMBODIMENTS

Figure 1:
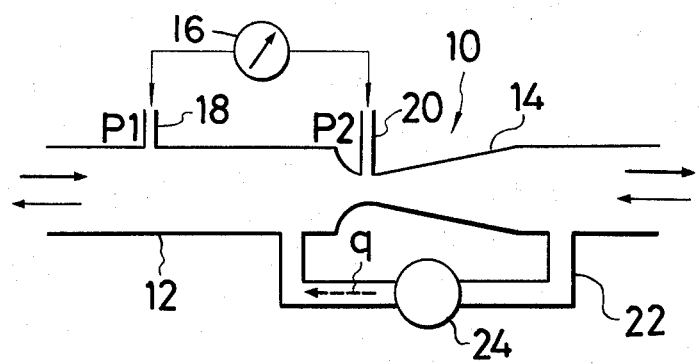
FIG. 1 is a diagramatic view of one form of flowmeter according to this invention.

Referring to FIG. 1, there is shown a preferred embodiment of a flowmeter 10 according to this invention. The flowmeter 10 includes a Venturi tube 14 having a converging portion connected to and communicating with a main pipeline 12 through which the fluid to be measured for its flow rate is adapted to flow. In order to measure a differential pressure between a fluid pressure P1 at a point in the maximum inner diameter portion of the Venturi tube 14 spaced a predetermined distance upstream of the throat portion of the Venturi tube, or in the main pipeline 12, and that P2 at a point in the throat portion of the Venturi tube 14, there is provided a differential pressure detector 16 having one terminal thereof connected to a pickup tube 18 of the pipeline 12 or the upstream, maximum inner diameter portion of the Venturi tube 14. The other terminal of the detector 16 is connected to a second pickup tube 20 communicating with the throat of the Venturi tube 14. The flowmeter 10 further includes a shunt or branch pipe 22 whose one end communicates with the upstream, maximum inner diameter portion of the Venturi tube while the other end communicates with the downstream, maximum inner diameter portion of the diffuser portion of the Venturi tube 14 which diverges from the throat portion at a cone angle smaller than that of the converging portion. The shunt pipe 22 includes a feed pump 24 for circulating, in the direction shown by a broken-line arrow, a predetermined part, $q$, of the fluid flowing through the main pipeline 12, through the shunt pipe 22 and the Venturi tube 14. The FIG. 1 embodiment may include as shown the main pipeline 12, the Venturi tube 14, and the shunt or branch pipe 22 as a unitary piece. This also applies to embodiments shown in FIGS. 3 to 9.

Figure 2:
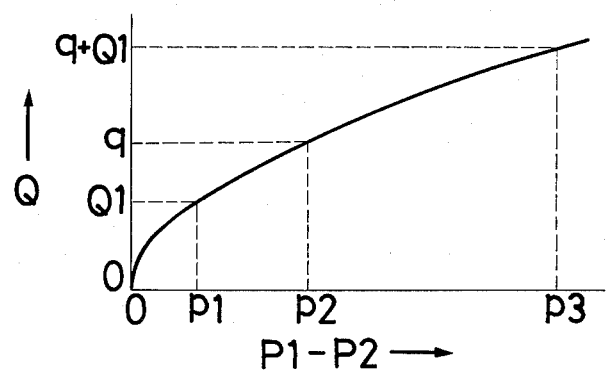
FIG. 2 is a chart illustrating the relationship of a differential fluid pressure detected between the upstream, maximum inner diameter portion and the throat portion of the Venturi tube shown in FIG. 1 to a flow rate of fluid flowing through the Venturi tube.

In operation, assume that the pump 24 is inactive with a null amount of fluid flowing through the shunt pipe 22. Now, if the fluid changing from zero to Q1 in flow rate flows in the direction of a thick arrow through the pipeline 12, the differential fluid pressure (P1 — P2) changes from zero to $pl$ as shown in FIG. 2, wherein the axis of abscissa shows a differential fluid pressure (P1 — P2) detected by the detector 16, and the axis of ordinate the flow rate Q of the fluid flowing through the main pipeline 12. Under this condition, the characteristic of the Venturi tube 14 is quite the same as that of the prior art.

If the pump 24 is actuated to circulate as a biasing flow the predetermined quantity of fluid $q$ through the Venturi tube 14 and the branch pipe 22 and thus the flow rate to be measured changes from zero to Q1, the differential pressure changes from p2 to p3.

At this time, as is clear from FIG. 2, a small change of the flow rate to be measured can be detected as a large change of the differential pressure compared to that of the prior art. In other words, according to this invention, the flowmeter can remarkably be enhanced in measuring sensibility compared to the prior art.

Further, according to this invention, there is given a substantially linear relationship between a flow rate to be measured and a corresponding sensed differential pressure and so measurement can be carried out with a high accuracy without using jointly any square root extracting unit. If the flow rate of fluid to be circulated by the pump 24 is selected to a proper value, a best result of measurement may be obtained.

Since fluid is circulated by the pump 24, even if there is a null flow rate in the pipeline 12, a differential fluid pressure exists between within the upstream and downstream, maximum inner diameter portions of the Venturi tube 14. However, if a Venturi tube is properly designed, the differential fluid pressure due to the biasing flow may be smaller by a pressure recovering action in the Venturi tube than one tenth of a differential pressure to be detected.

If the fluid to be detected flows in an opposite direction as shown by a thin arrow of FIG. 1 with the direction of the fluid flowing in the shunt pipe 22 unchanged, a fluid pressure rises at a point where the fluid has passed through the Venturi tube. In this case, It is desired to hold a flow rate of the fluid to be measured at a value less than the flow rate of the biasing fluid to be circulated.

Figure 3:
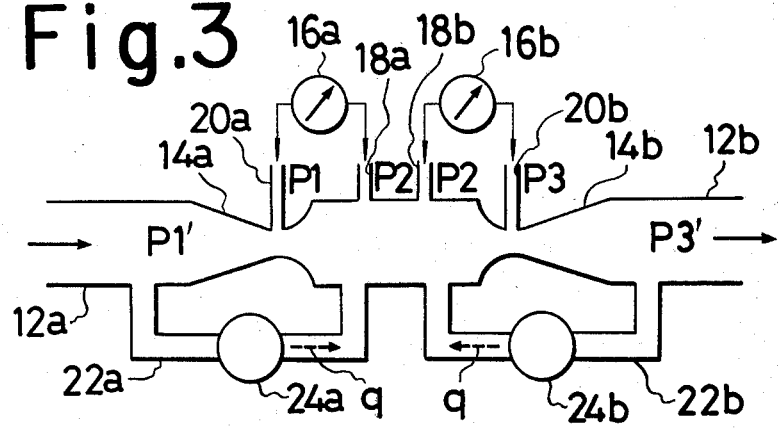
FIG. 3 is a schematic view of one form of mass flowmeter according to this invention, wherein two flowmeters of the character shown in FIG. 1 are connected to each other in a mirror image relation end to end.

Referring to FIG. 3, there is shown a preferred embodiment of a mass flowmeter according to this invention, wherein a differential pressure output is in proportion to the mass flow rate of fluid flowing in the pipeline 12 and the pressure loss is small. This flowmeter has a structure in which two structurally similar flowmeters of the character shown in FIG. 1 and described above are connected to each other in a mirror image relation end to end.

Now, if the fluid to be measured flows with a flow rate Q through the main pipeline 12a in the direction shown by a solid-line arrow, there exist the following relationship among the differential fluid pressure (P2 − P1) detected by the detector 16a, the pressure (P2 − P3) sensed by the detector 16b, the flow rate, Q, and the biasing flow rates, q:

$$(q - Q)^2 = \frac{2g}{\gamma} K (P2 - P1) \qquad (4)$$

$$(q + Q)^2 = \frac{2g}{\gamma} K (P2 - P3) \qquad (5)$$

where K is $c^2 \times \alpha^2$.

(5) − (4):

$$4qQ = \frac{2g}{\gamma} K \{(P2 - P3) - (P2 - P1)\} \qquad (6)$$

If the mass flow rate to be measured is $Qm$, $$Qm = \gamma Q = \frac{g}{2q} K \{(P2 - P3) - (P2 - P1)\} \qquad (7)$$

Therefore, the mass flow rate may be measured by finding the difference between the detected differential outputs of the detectors 16a and 16b.

The expression (7) is arranged as follows:

$$Qm = \frac{g}{2q} K (P1 - P3) \qquad (8)$$

Figure 4:
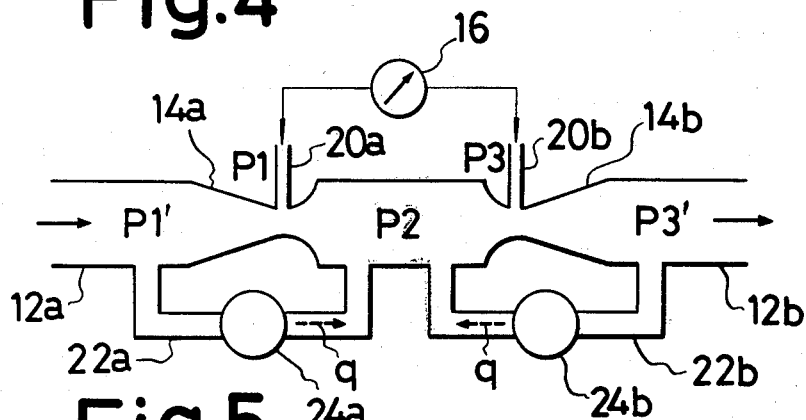
FIG. 4 is a view similar to FIG. 3 and of another form of mass flowmeter according to this invention, wherein one common differential pressure detector is used.

This expression suggests a third embodiment of the invention, shown in FIG. 4, wherein only one differential pressure detector 16 may be used to directly measure the mass flow rate, $Qm$, of the fluid without requiring a density measuring device.

Figure 5:
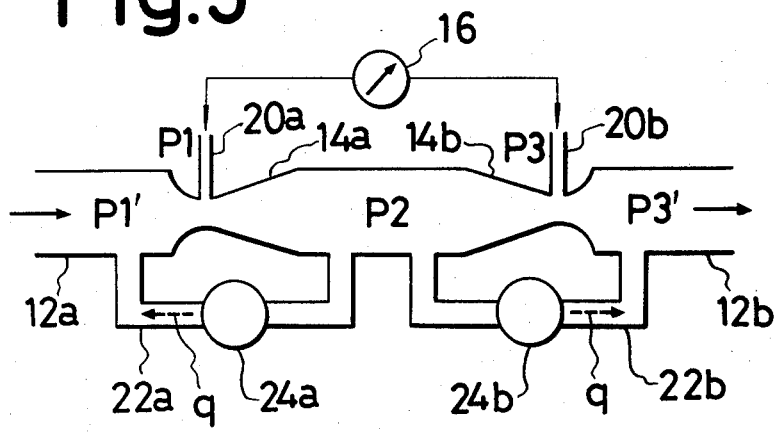
FIG. 5 is a view similar to FIG. 4 and of yet another form of mass flowmeter according to this invention, wherein two flowmeters of the character shown in FIG. 1 are connected to each other in a mirror relationship opposite to that shown in FIG. 3.

Referring to FIG. 5, there is shown a fourth embodiment of the invention, wherein two similar flowmeters are connected to each other in a mirror image relation reversely end to end compared to that of FIG. 4. However, this embodiment operates in a similar way to that of the FIG. 4 embodiment.

Figure 6:
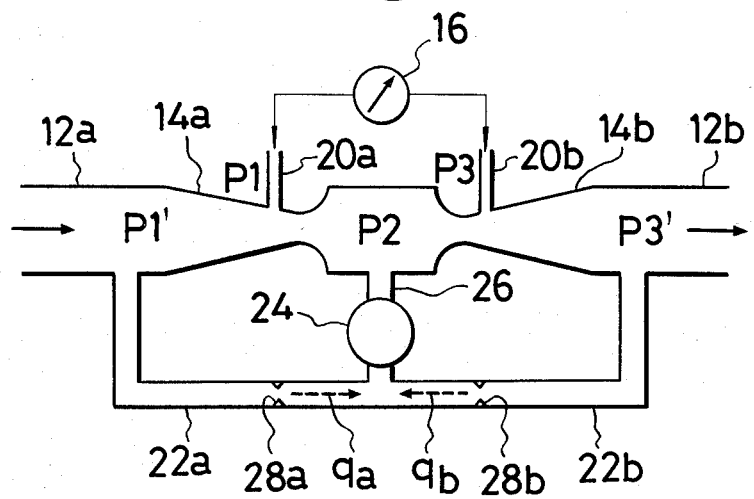
FIG. 6 is a diagramatic view similar to FIGS. 4 and 5, and of a further form of mass flowmeter according to this invention, wherein a common feed pump is used.

Next, referring to FIG. 6, there is shown a fifth embodiment of this invention similar to the fourth one shown in FIG. 5 and described just now, wherein only one feed pump 24 is used. In this embodiment, the feed pump 24 is disposed in a common portion 26 of the shunt pipes 22a and 22b communicating with the common joint portion of the two Venturi tubes 14a and 14b and the shunt pipes 22a and 22b communicating at one ends thereof with the Venturi tubes 14a and 14b are provided with throttling or restricting elements 28a and 28b, respectively, therein for equalizing both biasing flows qa and qb in the shunt pipes 22a and 22b to each other. The orifices of the elements 28a, 28b have respective flow sections smaller than those of the pipes 22a, 22b and are shorter in the direction of fluid flow than their diameters.

Now, explanation will be made on a pressure loss in the fluid to be measured in the embodiments of FIGS. 3 to 6. If fluid pressures at the throat portions of the Venturi tubes 14a and 14b are represented by P1 and P3, respectively, fluid pressures at the upstream, maximum inner diameter portion of the Venturi tube 14a, at the downstream, maximum inner diameter portion of the Venturi tube 14b, and at the common joint portion of the two Venturi tubes 14a and 14b by P1', P3' and P2, respectively, the following expressions are obtained:

$$(q - Q)^2 = \frac{2g}{\gamma} K (P2 - P1) \qquad (9)$$

$$(q - Q)^2 = \frac{2g}{\gamma} K' (P2 - P1') \qquad (10)$$

$$(q + Q)^2 = \frac{2g}{\gamma} K (P2 - P3) \qquad (11)$$

and $$(q + Q)^2 = \frac{2g}{\gamma} K' (P2 - P3') \qquad (12)$$

In the above expression, K' is a coefficient similar to the coefficient $K (= c^2 \times \alpha^2)$ of the expression (4) or (5), and the efficiency of the Venturi tube is given as follows:

$$\eta = 1 - \frac{K}{K'} \qquad (13)$$

A pressure loss (P1' − P3') at the flowmeter according to this invention is explained as follows:

(12) − (10):

$$4qQ = \frac{2g}{\gamma} K' (P1' - P3') \qquad (14)$$

(11) − (9):

$$4qQ = \frac{2g}{\gamma} K (P1 - P3) \qquad (15)$$

Therefore:

$$P1' - P3' = \frac{K}{K'}(P1 - P3)$$
$$= (1 - \eta)(P1 - P3) \qquad (16)$$

Therefore, as the efficiency $\eta$ approaches unity (1), it is possible to reduce the pressure loss toward zero compared to the detected differential pressure.

In the embodiment shown in FIG. 5, if fluid pressures at predetermined places in the flow course are designated as shown, the following expressions are obtained:

$$(q + Q)^2 = \frac{2g}{\gamma} K (P1' - P1) \qquad (17)$$

$$(q + Q)^2 = \frac{2g}{\gamma} K' (P1' - P2) \qquad (18)$$

$$(q - Q)^2 = \frac{2g}{\gamma} K (P3' - P3) \qquad (19)$$

and $$(q - Q)^2 = \frac{2g}{\gamma} K' (P3' - P2) \qquad (20)$$

(18) − (20):

$$4qQ = \frac{2g}{\gamma} K' (P1' - P3') \qquad (21)$$

(17) − (19):

$$4qQ = \frac{2g}{\gamma} K (P1' - P3' + P3 - P1) \qquad (22)$$

Therefore:

$$P1' - P3' = \frac{-K}{K-K'}(P3 - P1)$$

$$= \frac{1-\eta}{\eta}(P3 - P1) \qquad (23)$$

and

Therefore, if the efficiency, $\eta$, approaches unity (1), it is possible to reduce the pressure loss toward zero. However, the pressure loss at the FIG. 5 embodiment is generally large compared to that at the FIG. 3 embodiment.

Referring to FIG. 7, there is shown a preferred embodiment of a Venturi-tube device according to this invention in which the flow coefficient can be changed. FIG. 7 shows a Venturi tube 14 which has a bent portion 14' upstream of and integral with the throat portion thereof. A needle 30 is partially inserted in the Venturi tube 14 through the wall of the bent portion. The needle 30 has threads 32 provided on the outer circumference thereof and is concentrically supported by complementary threads (not shown) provided on the inner surfaces of a plurality of radial support members 34 which are provided in the Venturi tube 14.

If the needle 30 is rotated about its axis at its exposed end, it is moved axially and the tip end thereof adjusts the effective flow section of the throat portion of the Venturi tube 14. The support members 34 are preferably of a configuration that obstructs the flow of fluid in the Venturi tube 14 as little as possible.

Referring to FIG. 9, there is shown a mass flowmeter including two similar Venturi-tube devices of the character shown in FIG. 7 connected to each other at the ends of bent portions 14'a and 14'b thereof. Two joined Venturi tubes 14a and 14b form a U-like flow tube. This flowmeter is functionally similar to that shown in FIG. 6 except for the needles 30a and 30b.

In operation, assume that the fluid to be measured flows with flow rate Q in the directions of solid-line arrows through a main pipeline 12a, the Venturi tubes 14a, 14b and a main pipeline 12b and that a feed pump 24 is being actuated to circulate fluid with predetermined equal flow rates $q$, through shunt pipes 22a and 22b and Venturi tubes 14a and 14b in the directions of broken-line arrows, respectively. If fluid pressures at the common joint portion and at the respective throat portions are designated P2, P1, and P3, respectively as shown, the following expression is given at the Venturi tube 14a:

$$(q - Q) = C \cdot \alpha \sqrt{\frac{2g(P2 - P1)}{\gamma}} \qquad (24)$$

Therefore, $$(q - Q)^2 = \frac{2g}{\gamma} C^2 \cdot \alpha^2 (P2 - P1) \qquad (25)$$

and at the Venturi tube 14b:

$$(q + Q)^2 = \frac{2g}{\gamma} c'^2 \cdot \alpha'^2 (P2 - P3) \qquad (26)$$

By adjusting the needles 30a and 30b in the Venturi tubes 14a and 14b, respectively, we can obtain the following result:

$$c^2 \cdot \alpha^2 = c'^2 \cdot \alpha'^2 = K \qquad (27)$$

(26) − (25):

$$4qQ = \frac{2g}{\gamma} K (P1 - P3) \qquad (28)$$

then, $$Q\gamma = \frac{g}{2q} K (P1 - P3) \qquad (29)$$

This expression shows that a mass flow rate $Q\gamma$ can be obtained from the detected output (P1 − P3) of the differential pressure detector 16.

I claim:

1. A flowmeter comprising:
   a. two Venturi tubes,
      1. each Venturi tube having a throat portion, a first portion tapering at a first cone angle, and a second portion tapering at a second cone angle different from said first cone angle,
      2. each tapering portion having a first part of greatest inner cross section remote from said throat portion and a second part of smallest inner cross section connected to the second part of the other tapering portion by said throat portion,
      3. the first part of one of said tapering portions of one of said Venturi tubes being joined to the first part of the corresponding tapering portion of the other Venturi tube in a mirror image relationship;
   b. means for determining the difference between the fluid pressures in the throat portions of said Venturi tubes;
   c. two branch conduits having each two ends, one end of each branch conduit communicating with said joined parts, and the other ends of said branch conduits respectively communicating with the first parts of said Venturi tubes remote from said joined parts; and
   d. circulating means for circulating fluid through said branch conduits and said throat portions in opposite respective directions.

2. A flowmeter as set forth in claim 1, wherein said Venturi tubes are substantially identical.

3. A flowmeter as set forth in claim 1, wherein said circulating means includes means for circulating fluid through said throat portions in opposite directions.

4. A flowmeter as set forth in claim 1, wherein said one end is common to said two branch conduits.

5. A flowmeter as set forth in claim 4, wherein said circulating means include a pump in said one common end.

6. A flowmeter as set forth in claim 1, further comprising restricting means for restricting the flow section of at least one of said branch conduits.

7. A flowmeter as set forth in claim 1, further comprising a needle having a tapering tip portion in each of said Venturi tubes, and adjusting means for shifting the tip portion of each needle in the associated throat portion and for thereby varying the effective flow section of said associated throat portion.

8. A flowmeter as set forth in claim 7, further comprising a plurality of radially extending supporting members in each Venturi tube, said needle being externally threaded and threadedly engaging said supporting members for coaxially positioning said tip portion in the associated throat portion.

9. A flowmeter as set forth in claim 7, wherein the portion of each Venturi tube remote from said joined parts is bent, said needle passing outward of said tube through said bent portion.

10. A flowmeter comprising:
a. two Venturi tubes,
  1. each Venturi tube having a throat portion, a first portion tapering at a first cone angle, and a second portion tapering at a second cone angle different from said first cone angle,
  2. each tapering portion having a first part of greatest inner cross section remote from said throat portion and a second part of smallest inner cross section connected to the second part of the other tapering portion by said throat portion,
  3. the first part of one of said tapering portions of one of said Venturi tubes being joined to the first part of the corresponding tapering portion of the other Venturi tube in a mirror image relationship;
b. means for determining the difference between the fluid pressure in the throat portion of each Venturi tube and the fluid pressure in said joined first parts;
c. two branch conduits having each two ends, one end of each branch conduit communicating with said joined parts, and the other end of said branch conduits respectively communicating with the first parts of said Venturi tubes remote from said joined parts; and
d. circulating means for circulating fluid through said branch conduits and said throat portions in opposite respective directions.

11. A flowmeter as set forth in claim 1, wherein said circulating means include a pump in each of said branch circuits.

12. A flowmeter as set forth in claim 10, wherein said circulating means include a pump in each of said branch circuits.

* * * * *